April 29, 1930.    M. SASAKI    1,756,664
CANE CUTTER
Filed April 17, 1928    2 Sheets-Sheet 1
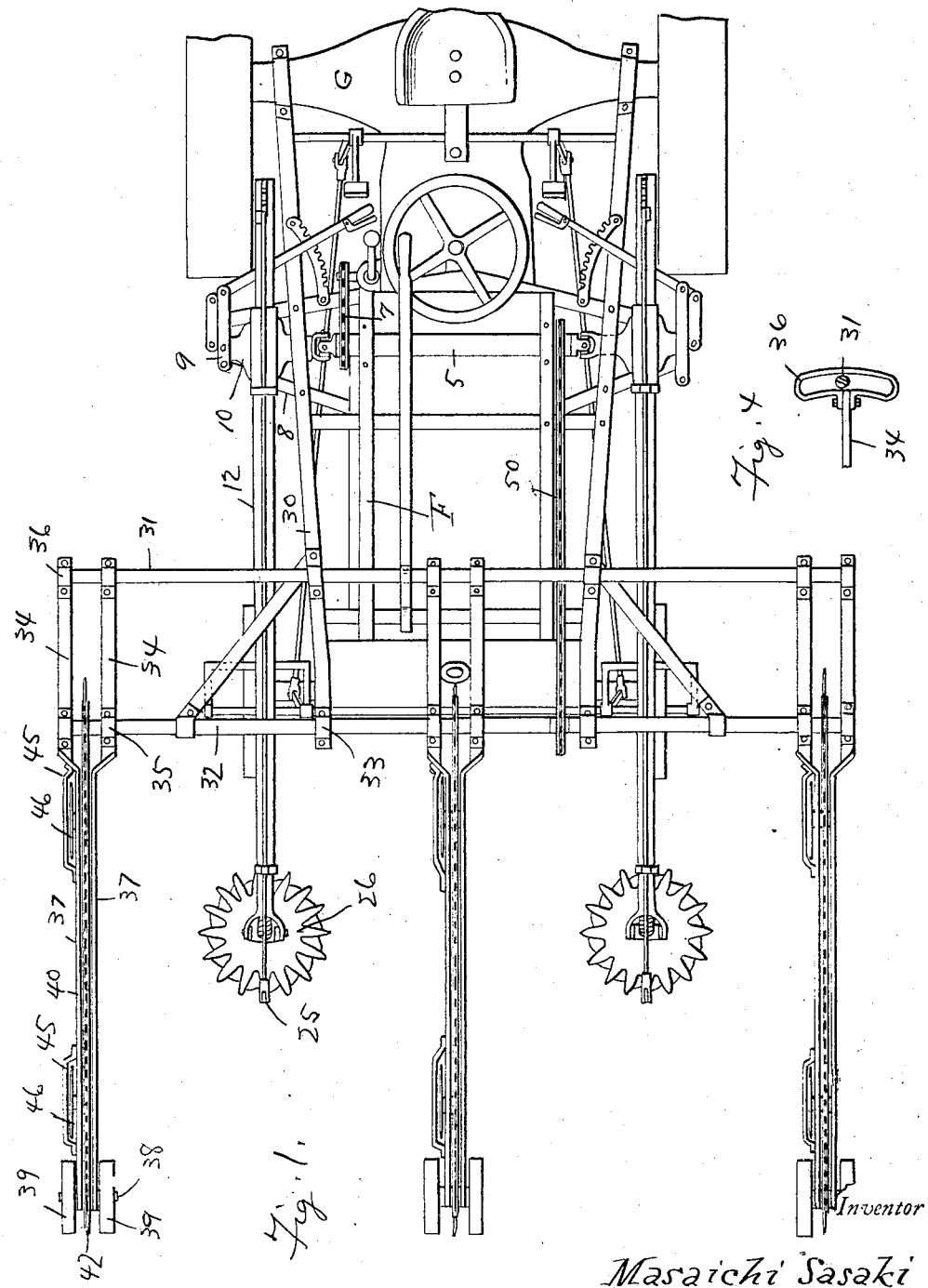
Inventor
Masaichi Sasaki
By Clarence A. O'Brien
Attorney April 29, 1930.  M. SASAKI  1,756,664
CANE CUTTER
Filed April 17, 1928   2 Sheets-Sheet 2
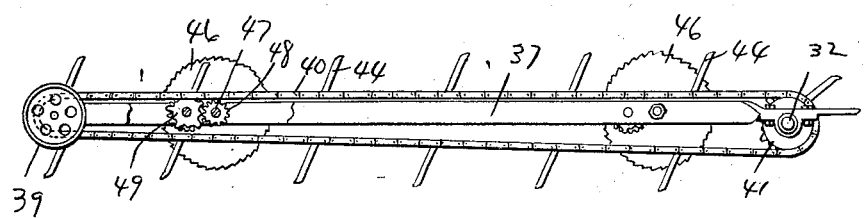
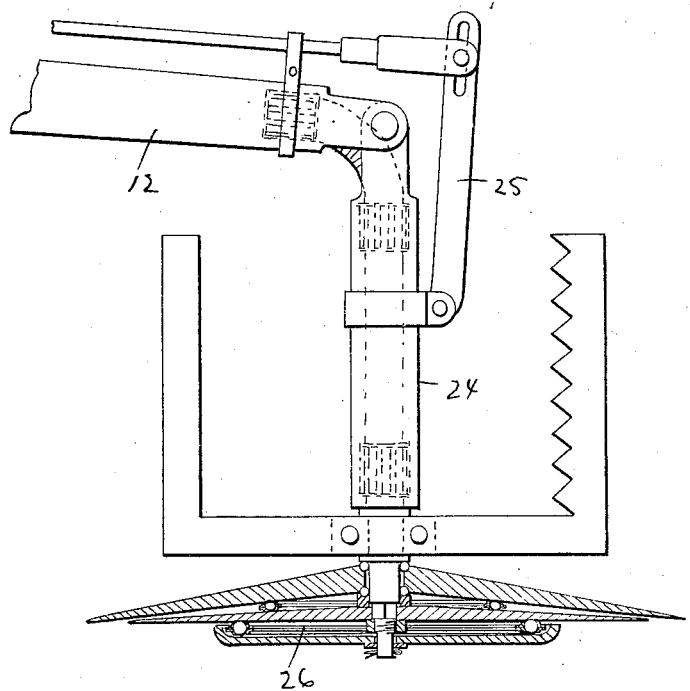
Inventor
Masaichi Sasaki
By Clarence A. O'Brien
Attorney Patented Apr. 29, 1930

1,756,664

UNITED STATES PATENT OFFICE

MASAICHI SASAKI, OF LIHUE, TERRITORY OF HAWAII

CANE CUTTER

Application filed April 17, 1928. Serial No. 270,782.

The present invention relates to an attachment for cutting sugar canes and has for its prime object to provide a construction for utilization in conjunction with the cane cutter disclosed in my pending application Serial No. 249,659 filed January 26, 1928.

Another very important object of the invention resides in the provision of an attachment of this nature which is reliable and efficient for cutting crawling sugar canes.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of a machine embodying the features of my invention, Figure 2 is a side elevation of one of the endless cutters, Figure 3 is a detail elevation of one of the cutting mechanisms for standing cane, portions being shown in section, and Figure 4 is a detail view of the rear end of one of the rockable bars.

Referring to the drawings in detail it will be seen that the letter G denotes generally a tractor of any preferred or conventional construction such, for example, as the well known Fordson tractor. A frame F of suitable formation is secured to the tractor and has journaled therein a shaft 5 extending transversely of the tractor and operatively connected to a power take off 6 usually provided on such tractors by means of a suitable chain and sprocket mechanism 7.

Extensions 8 are disposed to the side of the frame F projecting laterally therefrom and support brackets 9. Gear casings 10 have non-circular extensions 11 projecting therefrom and slidably received in the brackets 9. Hollow elongated arms 12 project forwardly from the gear casing 10 and support hingedly on their forward ends auxiliary arms 24 operatively connected by suitable means 25 for rocking the auxiliary arms.

Cutting mechanism 26 is mounted on these arms at their lower ends. All the structure thus far defined has been disclosed in detail in my co-pending application and has been illustrated herein merely for the purposes of bringing out the utility of the attachment.

Referring now to the attachment it will be seen that frame members 30 attached to the tractor and extending forwardly to the sides thereof support the transverse bar 31 adjacent their forward ends and a transverse shaft 32.

The shaft 32 is journaled in bearings 33. A plurality of pairs of bars 34 have bearings 35 to rotatably receive the shaft 32 and their rear ends are provided with arcuate loop members 36 to receive the bar 31, as indicated in Figure 4. The forward ends of these bars 34 of each pair are twisted and bent inwardly toward each other and merge into spaced parallel extensions 37 between the forward ends of which is journaled a sprocket on the axle 38 of wheels 39. An endless chain 40 is trained over sprockets 41 and 42 the former being fixed to the shaft 32 and the latter rotatable on the axle 38 and this chain has at spaced intervals knives 44 projecting outwardly therefrom.

Frames 45 are mounted on one of the extensions 37 of each pair and have journaled therein saws 46 the shafts 47 of which have pinions 48 meshing with combined sprocket and gears 49, the sprocket portions of which are engaged with the upper run of the chain 40. The shaft 32 is operatively connected to the shaft 5 by means of the chain and sprocket mechanism 15.

It will therefore be seen that when the mechanisms 26 are in operation my attachment mechanism is also in operation and the chains will move knives 40 and cause the rotation of the saws so as to sever crawling cane on the ground.

It is thought that the construction, utility and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A crawling cane attachment of the class described including, in combination, a frame structure for attachment to a tractor, a transverse bar, means for attaching the bar to the frame structure, a transverse shaft, means for journalling the transverse shaft to the frame structure in front of the bar, a plurality of pairs of bars rockable on the shaft and having elongated loop members receiving the transverse bar, the forward ends of each pair of bars having spaced parallel extensions, a chain and sprocket mechanism between each pair of extensions, sprockets of the mechanism being fixed to the shaft, knives projecting from the chain.

2. A crawling cane attachment of the class described including, in combination, a frame structure for attachment to a tractor, a transverse bar, means for attaching the bar to the frame structure, a transverse shaft, means for journalling the transverse shaft to the frame structure in front of the bar, a plurality of pairs of bars rockable on the shaft and having elongated loop members receiving the transverse bar, the forward ends of each pair of bars having spaced parallel extensions, a chain and sprocket mechanism between each pair of extensions, sprockets of the mechanism being fixed to the shaft, knives projecting from the chain, wheels supporting the forward ends of the extension.

3. A crawling cane attachment of the class described including, in combination, a frame structure for attachment to a tractor, a transverse bar, means for attaching the bar to the frame structure, a transverse shaft, means for journalling the transverse shaft to the frame structure in front of the bar, a plurality of pairs of bars rockable on the shaft and having elongated loop members receiving the transverse bar, the forward ends of each pair of bars having spaced parallel extensions, a chain and sprocket mechanism between each pair of extensions, sprockets of the mechanism being fixed to the shaft, frames on one extension of each pair, saws journaled in the last mentioned frame, and means operatively connecting the saws with the chain.

4. An apparatus of the class described comprising a frame for attachment to a tractor, a shaft, means for operating the shaft on the tractor, a pair of bars rockable on the shaft, said bars having spaced parallel extensions projecting forwardly therefrom, a chain and sprocket mechanism mounted between the extensions and operatively connected with the shaft, wheels supporting the forward ends of the extensions.

5. An apparatus of the class described comprising a frame for attachment to a tractor, a shaft, means for operating the shaft on the tractor, a pair of bars rockable on the shaft, said bars having spaced parallel extensions projecting forwardly therefrom, a chain and sprocket mechanism mounted between the extensions and operatively connected with the shaft, wheels supporting the forward ends of the extensions, saws on the side of one of the extensions of each pair, and means operatively connecting the saws with the chain and sprocket mechanism.

6. An apparatus of the class described comprising a frame for attachment to a tractor, a shaft, means for operating the shaft on the tractor, a pair of bars rockable on the shaft, said bars having spaced parallel extensions projecting forwardly therefrom, a chain and sprocket mechanism mounted between the extensions and operatively connected with the shaft, wheels supporting the forward ends of the extensions, saws on the side of one of the extensions of each pair, and means operatively connecting the saws with the chain and sprocket mechanism, a bar supported on the frame, the rear ends of the pair of bars having elongated arcuate leaf members receiving the transverse bar.

7. An apparatus of the class described comprising a frame for attachment to a tractor, spaced parallel extensions projecting forwardly of the frame, saws carried by said extension, means for operating the saws, and means for supporting the forward end of the extension.

8. An apparatus of the class described comprising a frame for attachment to a tractor, an extension projecting forwardly of the frame, a frame carried by said extension, a saw journaled in said last mentioned frame, a chain and sprocket mechanism carried by said extension, means operatively connecting the saw with the chain, and knives projecting from the chain.

9. An apparatus of the class described comprising a frame for attachment to a tractor, said frame being provided with a plurality of spaced parallel extensions projecting forwardly therefrom, a plurality of cutting elements carried by said extension, and means for operating said cutting elements.

In testimony whereof I affix my signature.

MASAICHI SASAKI.